US011350661B2

(12) United States Patent
Santos Vale

(10) Patent No.: US 11,350,661 B2
(45) Date of Patent: Jun. 7, 2022

(54) AEROSOL-GENERATING ARTICLE COMPRISING AN AEROSOL-COOLING ELEMENT

(71) Applicant: PHILIP MORRIS PRODUCTS S.A., Neuchatel (CH)

(72) Inventor: Miguel Lereno Santos Vale, Aarau (CH)

(73) Assignee: Philip Morris Products S.A., Neuchatel (CH)

( * ) Notice: Subject to any disclaimer, the term of this patent is extended or adjusted under 35 U.S.C. 154(b) by 12 days.

(21) Appl. No.: 16/967,836

(22) PCT Filed: Jan. 23, 2019

(86) PCT No.: PCT/EP2019/051672
§ 371 (c)(1),
(2) Date: Aug. 6, 2020

(87) PCT Pub. No.: WO2019/158335
PCT Pub. Date: Aug. 22, 2019

(65) Prior Publication Data
US 2021/0037878 A1 Feb. 11, 2021

(30) Foreign Application Priority Data

Feb. 15, 2018 (EP) .................... 18157001

(51) Int. Cl.
*A24D 3/17* (2020.01)
*A24D 1/02* (2006.01)
*A24C 5/01* (2020.01)
*A24D 1/20* (2020.01)
*B29C 65/08* (2006.01)
*B29C 65/36* (2006.01)
*B29K 667/00* (2006.01)
*B29L 31/00* (2006.01)

(52) U.S. Cl.
CPC .................. *A24D 1/02* (2013.01); *A24C 5/01* (2020.01); *A24D 1/20* (2020.01); *A24D 3/17* (2020.01); *B29C 65/08* (2013.01); *B29C 65/36* (2013.01); *B29K 2667/046* (2013.01); *B29L 2031/7416* (2013.01)

(58) Field of Classification Search
CPC ............... A24D 1/20; A24D 3/17; A24C 5/47
See application file for complete search history.

(56) References Cited

U.S. PATENT DOCUMENTS 2,001,079 A 5/1935 Glenn
3,437,093 A 4/1969 Williamson
(Continued)

FOREIGN PATENT DOCUMENTS

WO WO 2018/002264 1/2018

OTHER PUBLICATIONS

PCT Search Report and Written Opinion for PCT/EP2019/051672 dated Mar. 27, 2019 (10 pages).
(Continued)

*Primary Examiner* — Eric Yaary
(74) *Attorney, Agent, or Firm* — Mueting Raasch Group

(57) ABSTRACT

An aerosol-cooling element (100) for an aerosol-generating article. The aerosol-cooling element (100) comprises an interior structure (102) and a wrapper material (104) secured around the interior structure (102). The wrapper material (104) comprises a first portion (106) welded to a second portion (108) of the wrapper material (104).

12 Claims, 7 Drawing Sheets

(56) References Cited

U.S. PATENT DOCUMENTS

Figure 1:
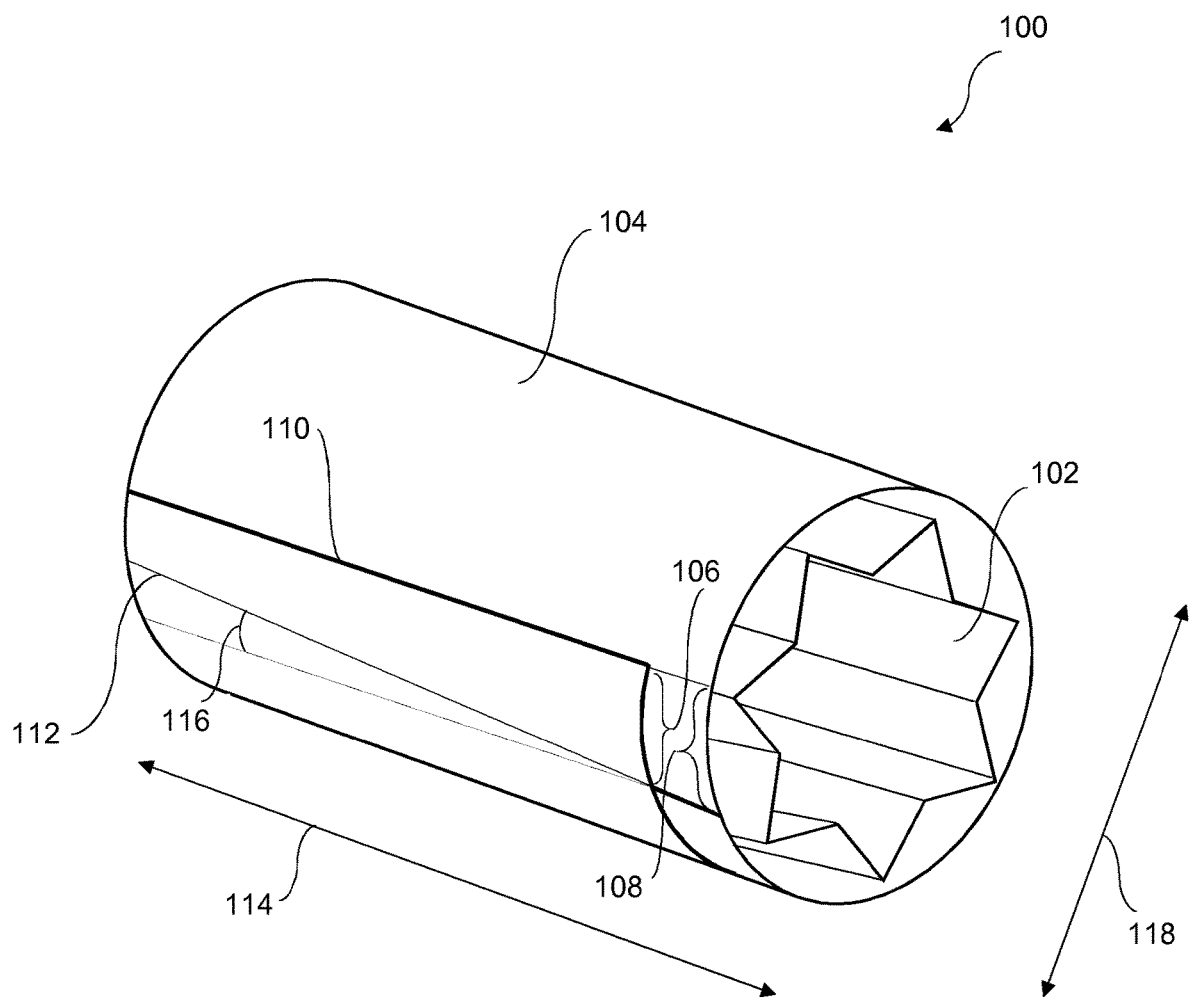

2008/0202537 A1    8/2008   Spatafora
2014/0224268 A1    8/2014   Ryter
2014/0305448 A1   10/2014   Zuber

OTHER PUBLICATIONS

Extended European Search Report for Application No. 18157001.1 dated Aug. 14, 2018 (7 pages).

AEROSOL-GENERATING ARTICLE COMPRISING AN AEROSOL-COOLING ELEMENT

This application is a U.S. National Stage Application of International Application No. PCT/EP2019/051672 filed Jan. 23, 2019, which was published in English on Aug. 15, 2019 as International Publication No. WO 2019/158335 A1. International Application No. PCT/EP2019/051672 claims priority to European Application No. 18157001.1 filed Feb. 15, 2018.

The present invention relates to aerosol cooling elements for aerosol-generating articles and to methods of their manufacture. In particular, the present invention relates to aerosol-cooling elements comprising a wrapper material secured by welding.

Aerosol-generating articles may comprise a plurality of elements assembled in the form of a rod. These elements may include an aerosol-forming substrate and an aerosol-cooling element located downstream from the aerosol-forming substrate.

As used herein, the term 'rod' is used to denote a generally cylindrical element of substantially circular, oval or elliptical cross-section.

As used herein, the term 'longitudinal direction' refers to a direction extending along, or parallel to, the cylindrical axis of a rod.

The terms "upstream" and "downstream" may be used to describe relative positions of elements or components of the aerosol-generating article. For simplicity, the terms "upstream" and "downstream" as used herein refer to a relative position along the rod of the aerosol-generating article with reference to the direction in which the aerosol is drawn through the rod.

The manufacture of aerosol-generating articles comprising aerosol-cooling elements may include forming raw material into a sheet. The sheet may then be crimped between two rollers to introduce parallel lines of weakness into the sheet. The crimped sheet may then be gathered into a rod by folding the sheet about the lines of weakness to form the rod with an internally pleated structure. This may be achieved by pulling the crimped sheet material through a funnel to compress the sheet into a continuous rod having a diameter approximately the diameter of the final tubular rod. The continuous rod may then be wrapped in a wrapper. The wrapper may be wrapping paper or other suitable wrapping material. For example, glue may be applied to one edge of the wrapper so that it can be wrapped around the continuous rod. The wrapped continuous rod may be compressed into a final desired shape while being heated to dry the applied glue. The wrapped continuous rod may then be cut into rods of smaller length to produce cooling elements of a desired length for use in aerosol-generating articles. The cooling elements described above have a large internal surface area that may provide enhanced thermal exchange between the cooling element and aerosol moving through it.

The manufacture of aerosol-generating articles comprising aerosol-cooling elements can present several problems during production and in the finished article. One potential problem, which may be worsened by a high-mechanical resistance to compression of the sheet material, is that the glue may fail to hold the wrapper around the rod. This can lead to expansion of the wrapper over time and, thus, a failure in a control of a diameter of the rod. Furthermore, the wrapper seam may come apart completely. This can cause problems in later processes where a faulty rod may jam downstream equipment. For example, the combiner, which combines the elements of an aerosol-generating article and assembles them into the article can become jammed by unravelled or expanded aerosol-cooling elements.

Another potential problem is glue pollution, where surplus glue from the seal may contaminate downstream equipment.

It is an object of the present invention to mitigate one or more problems associated with the manufacture of aerosol-cooling elements.

According to one aspect of the invention there is provided an aerosol-cooling element for an aerosol-generating article, the aerosol-cooling element comprising:

an interior structure formed by crimping and folding a sheet material to form a cylindrical rod, the cylindrical rod having an average circumference of C1 in the absence of any external compressive forces; and a wrapper material secured around the interior structure to form a rod with a predetermined circumference C2;

wherein the wrapper material comprises a first portion welded to a second portion of the wrapper material;

wherein the interior structure is under compression by the wrapper material when the wrapper material is secured around the interior structure;

and wherein C1/C2 is in a range from 1.2 to 6.

In some embodiments, C1/C2 is in a range from 1.3 to 4. In some embodiments, C1/C2 is in a range from 1.4 to 2.5.

The average circumference is determined by measuring the average circumference of the cylindrical rod formed after the sheet material has been crimped and gathered. C1 is determined on a test bench by passing a sheet identical to that used on a production line through a funnel structure of the same dimensions as that used on the production line, without wrapping the gathered sheet. C1 is measured after the passing of a predetermined time of 2 minutes, after the sheet material has been gathered and folded. This is in order to allow the gathered and folded sheet material to settle into an uncompressed gathered state. C1 is then measured by way of a measuring tape passed around the cylindrical rod formed after the sheet material has been crimped and folded, taking care not to compress the cylindrical rod with the measuring tape while measuring C1.

C2 is measured by measuring the circumference of the rod formed by the wrapper material secured around the interior structure in the same way as C1.

The wrapper is welded around the interior structure, rather than by the application of glue, thereby addressing problems associated with a glued seam in the wrapper material.

Because C2 is less than C1, it will be understood that the interior structure is under compression by the wrapper. As such, the interior structure will tend to exert an outward force on the wrapper. Accordingly, using a known glued seam in the wrapper material would be problematic, because the outward force could cause the seam to come apart before the glue had set.

This problem may be addressed by compressing the interior structure and the wrapper material when securing the wrapper material around the interior structure by welding the first portion of the wrapper material to the second portion of the wrapper material.

As used herein, the term 'welded' may refer to any form of bonding or fusing, where heat is applied to cause a bond with the absence of an adhesive. In a non-limiting example, welding may include at least partially melting a material.

As used herein, the term 'aerosol-generating article' refers to an article comprising an aerosol-forming substrate that is capable of releasing volatile compounds that can form an aerosol, for example by heating, combustion or a chemical reaction.

As used herein, the term 'aerosol-forming substrate' is used to describe a substrate capable of releasing volatile compounds, which can form an aerosol. The aerosols generated from aerosol-forming substrates of aerosol-generating articles according to the invention may be visible or invisible and may include vapours (for example, fine particles of substances, which are in a gaseous state, that are ordinarily liquid or solid at room temperature) as well as gases and liquid droplets of condensed vapours.

As used herein, the term 'aerosol-cooling element' is used to describe an element having a large surface area and a predetermined resistance to draw. In use, an aerosol formed by volatile compounds released from the aerosol-forming substrate passes over and is cooled by the aerosol-cooling element before being inhaled by a user. In contrast to high resistance to draw filters and other mouthpieces, aerosol-cooling elements have a low resistance to draw. Chambers and cavities within an aerosol-generating article are also not considered to be aerosol cooling elements.

As used herein, the terms 'sheet' and 'web' denote a laminar element having a width and length substantially greater than the thickness thereof.

As used herein, the term 'corrugated' denotes a sheet or web with a plurality of corrugations, undulations or striations oriented in substantially the same direction.

As used herein, the term 'corrugations' denotes a plurality of substantially parallel ridges formed from alternating peaks and troughs joined by corrugation flanks. This includes, but is not limited to, corrugations having a square wave profile, sinusoidal wave profile, triangular profile, sawtooth profile, or any combination thereof.

As used herein, the term 'crimped' denotes a sheet or web with a plurality of corrugations.

As used herein, the terms 'gathered' or 'gathering' denote that a web or sheet is convoluted, or otherwise compressed or constricted substantially transversely to the cylindrical axis of the rod.

Aspects of the invention do not require prior application of a glue to the wrapper material. Furthermore, welding may be achieved at a quicker rate than glue which may require curing or uniform application of pressure.

The interior structure may comprise a crimped, pleated or folded sheet material. Advantageously, this increases the surface area of the interior structure which may increase its cooling ability.

The first portion of the wrapper material may be a region contiguous and parallel to a first edge of the wrapper material, and the second portion may be a region contiguous and parallel to a second edge of the wrapper material. Advantageously, this may provide a uniform, symmetric cooling element.

The interior structure may comprise a longitudinal axis and the second edge of the wrapper material may be aligned at a non-zero angle to the longitudinal axis.

The first portion may be welded to the second portion via a conductive element. In embodiments, the conductive element may comprise a metallic strip. In embodiments, the conductive element may be in contact with the first or second portion, or may be arranged between the first and second portions. The conductive element may conduct heat to the first and/or second portion to induce welding of the first portion to the second portion. Advantageously, this may increase ease and/or speed of the welding.

The first portion may be induction welded to the second portion. Induction welding uses electromagnetic induction to heat a conductive element. This may provide a quick and optionally contactless process for welding the first portion to the second portion.

Alternatively, the first portion may be ultrasonically welded to the second portion. Ultrasonic welding may use high frequency vibrations to weld one portion to another. The vibrations may be applied by a sonotrode for example. Advantageously, this may provide a quick method of welding that does not require the presence of a conductive element.

The aerosol-cooling element may have a length between 7 mm and 28 mm, or optionally from 10 to 25 mm, or optionally from 13 to 22 mm, optionally from 16 to 19 mm.

The aerosol-cooling element may have a diameter between 5 mm and 12 mm, optionally from 6 to 9 mm, or optionally from 7 to 8 mm.

The wrapper material may comprise a thermoplastic polymer. Advantageously, a thermoplastic polymer may be readily welded to itself to provide a strong seal. Furthermore, polymeric materials can be formulated to have a melting point optimised for a particular welding process. Optionally, the interior structure may comprise polylactic acid.

The first portion and/or second portion of the wrapper may comprise an additional material that can be melted or heated to induce tack. The additional material may be in the form of one or more regions added to the wrapper, e.g. a thermoplastic strip added to the first portion and/or second portion of the wrapper. The additional material may allow welding of wrappers formed from material that cannot conventionally be welded, or may further improve the welding performance of a wrapper.

According to another aspect of the invention there is provided an aerosol-generating article, the aerosol-generating article comprising any aerosol-cooling element in accordance with any aspect described herein.

The aerosol-generating article may comprise an aerosol-forming substrate and the aerosol-cooling element may be located downstream of the aerosol-forming substrate.

According to another aspect of the invention there is provided a method for manufacturing an aerosol-cooling element for an aerosol-generating article, the method comprising:

providing an interior structure of the aerosol-cooling element by crimping and folding a sheet material into a rod shape;

wrapping the interior structure of the aerosol-cooling element with a wrapper material;

securing the wrapper material around the interior structure by welding a first portion of the wrapper material to a second portion of the wrapper material; and compressing the interior structure and wrapper material when securing the wrapper material around the interior structure.

Providing the interior structure may comprise forming a sheet material into a rod shape. Forming a sheet material into a rod shape may comprise crimping the sheet material, and/or pleating or folding the sheet material. Pleating or folding the sheet material may comprise passing the sheet material through a funnel having an outlet diameter similar to that of the desired rod shape.

The first portion of the wrapper material may be a region contiguous and parallel to a first edge of the wrapper material and the second portion may be a region contiguous and parallel to a second edge of the wrapper material.

The interior structure may comprise a longitudinal axis; and wrapping the interior structure of the aerosol-cooling element may comprise placing the second edge in contact with the interior structure and at a non-zero angle to the longitudinal axis, and placing the first edge over the second edge.

The method of manufacturing an aerosol-cooling element may further comprise placing a conductive element between the first portion and second portion of the wrapper material; and heating the conductive element to at least partially melt the first portion of the wrapper material. Optionally the conductive element may be placed in contact with one of the first portion or the second portion only, to weld one portion to the other.

The method may comprise welding by induction welding. This may comprise inducing a current in a conductive element to melt a portion of the wrapper. Alternatively, the method may comprise welding by ultrasonic welding. Ultrasonic welding may comprise using a sonotrode to at least partially melt the wrapper material.

The method of manufacturing an aerosol-cooling element may further comprise compressing the interior structure and wrapper material when securing the wrapper around the interior structure.

According to another aspect of the invention there is provided a method for manufacturing an aerosol-generating article, the method comprising manufacturing an aerosol-cooling element according to the foregoing aspects of the invention; and incorporating the aerosol-cooling element into the aerosol-generating article.

The method may additionally comprise incorporating an aerosol-forming substrate in the aerosol-generating article, and incorporating the aerosol-cooling element downstream of the aerosol-forming substrate.

According to another aspect of the invention there is provided an apparatus for manufacturing an aerosol-cooling element for an aerosol-generating article, the apparatus comprising:

a gathering unit to gather and fold a supply of crimped sheet material into a rod shaped interior structure for the aerosol-cooling element rod shape;

a wrapping unit to wrap the interior structure about a longitudinal axis of the rod shape with a wrapper material and to secure the wrapper material around the interior structure by welding a first portion of the wrapper material to a second portion of the wrapper material; and a compressing unit to compress the interior structure and wrapper material when securing the wrapper material around the interior structure.

It will be appreciated that preferred features described above in relation to one aspect of the invention may also be applicable to other aspects of the invention Embodiments of the invention will now be described, by way of example only, with reference to the accompanying drawings.

FIG. 1 shows a schematic diagram of an aerosol-cooling element according to an embodiment of the present invention;

FIG. 2 shows a schematic diagram of a longitudinal cross section through an aerosol-generating article comprising the aerosol-cooling element according to an embodiment of the present invention;

FIG. 3 shows a schematic diagram of an apparatus for production of aerosol-cooling elements according to an embodiment of the present invention;

FIG. 4 shows a flow chart of a method of manufacturing the aerosol-cooling elements according to an embodiment of the present invention;

FIG. 5 shows a flow chart of a method of securing the wrapper material according to an embodiment of the present invention;

FIG. 6 shows a flow chart of a method of securing the wrapper material according to another embodiment of the present invention; and FIG. 7 shows a flow chart of a method of securing the wrapper material according to a further embodiment of the present invention.

The present invention relates to an aerosol-cooling element for an aerosol-generating article. Aerosol-generating articles in which an aerosol-forming substrate, such as a tobacco containing substrate, is heated rather than combusted are known in the art. Examples of systems using aerosol-generating articles include systems that heat a tobacco containing substrate above 200 degrees Celsius to produce a nicotine-containing aerosol.

The aerosol-cooling element may act to cool the temperature of a stream of aerosol drawn through the element by means of thermal transfer. Components of the aerosol will interact with the aerosol-cooling element and lose thermal energy.

The aerosol-cooling element may act to cool the temperature of a stream of aerosol drawn through the element by undergoing a phase transformation that consumes heat energy from the aerosol stream. For example, the material forming the aerosol-cooling element may undergo a phase transformation such as melting or a glass transition that requires the absorption of heat energy. If the element is selected such that it undergoes such an endothermic reaction at the temperature at which the aerosol enters the aerosol-cooling element, then the reaction will consume heat energy from the aerosol stream.

In some embodiments, the temperature of an aerosol stream may be lowered by more than 10 degrees Celsius as it is drawn through an aerosol-cooling element. In some embodiments, the temperature of an aerosol stream may be lowered by more than 15 degrees Celsius or more than 20 degrees Celsius as it is drawn through an aerosol-cooling element.

FIG. 1 shows a schematic diagram of an aerosol-cooling element 100 for an aerosol-generating article according to an embodiment of the present invention. Aerosol-cooling element 100 comprises an interior structure 102 and a wrapper material 104 secured around the interior structure 102. The wrapper material 104 comprises a first portion 106 welded to a second portion 108 of the wrapper material 104.

The interior structure 102 comprises a crimped, pleated or folded sheet material.

As used herein, the term 'crimped' denotes a sheet having a plurality of substantially parallel ridges or corrugations. Preferably, when the aerosol-generating article has been assembled, the substantially parallel ridges or corrugations extend in a longitudinal direction with respect to the rod. As used herein, the terms 'gathered', 'pleated', or 'folded' denote that a sheet of material is convoluted, folded, or otherwise compressed or constricted substantially transversely to the cylindrical axis of the rod. A sheet may be crimped prior to being gathered, pleated or folded. A sheet may be gathered, pleated or folded without prior crimping.

In some embodiments, the sheet material may comprise a sheet material selected from the group comprising a metallic foil, a polymeric sheet, and a substantially non-porous paper or cardboard. In some embodiments, the aerosol-cooling element may comprise a sheet material selected from the group consisting of polyethylene (PE), polypropylene (PP), polyvinylchloride (PVC), polyethylene terephthalate (PET), polylactic acid (PLA), cellulose acetate (CA), and aluminium foil.

The internal structure 102 fabricated from a crimped, pleated or folded material sheet increases the surface area of the internal structure and, thus, the ability of the internal structure 102 to cool aerosol passing through it.

The internal structure 102 may be formed from a sheet material that has a specific surface area of between about 10 square millimetres per milligram ($mm^2/mg$) and about 100 square millimetres per milligram ($mm^2/mg$). In some embodiments, the specific surface area may be about 35 $mm^2/mg$. Specific surface area can be determined by taking a material having a known width and thickness. For example, the material may be a polylactic acid material having an average thickness of 50 micrometres with a variation of ±2 micrometres. Where the material also has a known width, for example, between about 200 millimetres and about 250 millimetres, the specific surface area and density can be calculated.

The first portion 106 of the wrapper material 104 is a region contiguous and parallel to a first edge 110 of the wrapper material 104 and the second portion 108 is a region contiguous and parallel to a second edge 112 of the wrapper material 104.

The interior structure 102 has a longitudinal axis. The second edge 112 of the wrapper material 104 is aligned at a non-zero angle 116 to the longitudinal axis. For example, the second edge 112 may be at an angle 116 (to the longitudinal axis) of about 20 degrees, 30 degrees or 40 degrees.

The first portion 106 may be melt-bonded to the second portion 108 via a metallic strip (not shown). Alternatively, the first portion 106 may be induction welded to the second portion 108. The first portion 106 may be ultrasonically welded to the second portion 108.

The aerosol-cooling element 100 may have a length 114 between 7 mm and 28 mm and may have a diameter 118 between 5 mm and 12 mm.

The wrapper material 104 may comprise, or be made, from a polymer. In some examples, the interior structure 102 comprises, or is made, from polylactic acid.

Figure 2:
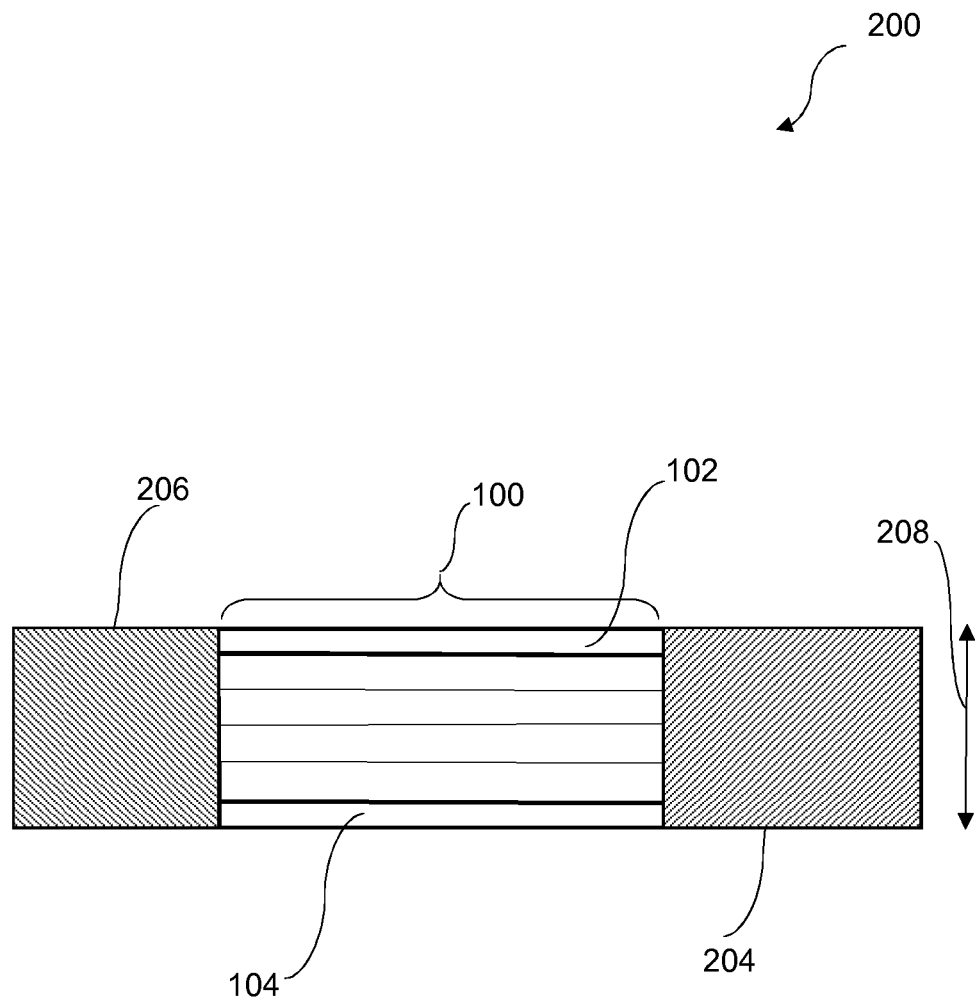

FIG. 2 shows a cross sectional diagram of an aerosol-generating article 200 comprising the aerosol-cooling element 100 of FIG. 1. The aerosol-generating article 200 further comprises an aerosol-forming substrate 204 and a filter 206. The aerosol-cooling element 100 is located downstream of the aerosol-forming substrate 204 and upstream of the filter 206.

The elements of the aerosol-generating article 200 are preferably held together by means of a suitable wrapper, for example a tipping paper. The tipping paper may comprise any suitable material for wrapping components of the aerosol-generating article 200 in the form of a rod. The tipping paper needs to grip the component elements of the aerosol-generating article 200 when the article 200 is assembled and hold them in position within the rod. Suitable materials are well known in the art.

The aerosol-generating article 200 may have a total length between approximately 30 mm and approximately 100 mm. The aerosol-generating article 200 may have an external diameter 208 between approximately 5 mm and approximately 12 mm. The filter 206 may be located at the downstream end of the aerosol-generating article 200. The filter 206 may be a cellulose acetate filter plug. The filter 206 may be approximately 7 mm in length in one embodiment, but may have a length of between approximately 5 mm and approximately 10 mm. The aerosol-generating article 200 may comprise a spacer element (not shown) located downstream of the aerosol-forming substrate 204. In one example, the aerosol-generating article 200 has a total length of approximately 45 mm. The aerosol-generating article 200 may have an external diameter 208 of approximately 7.2 mm. Further, the aerosol-forming substrate 204 may have a length of approximately 10 mm. Alternatively, the aerosol-forming substrate 204 may have a length of approximately 12 mm. Further, the diameter of the aerosol-forming substrate 204 may be between approximately 5 mm and approximately 12 mm.

Figure 3:
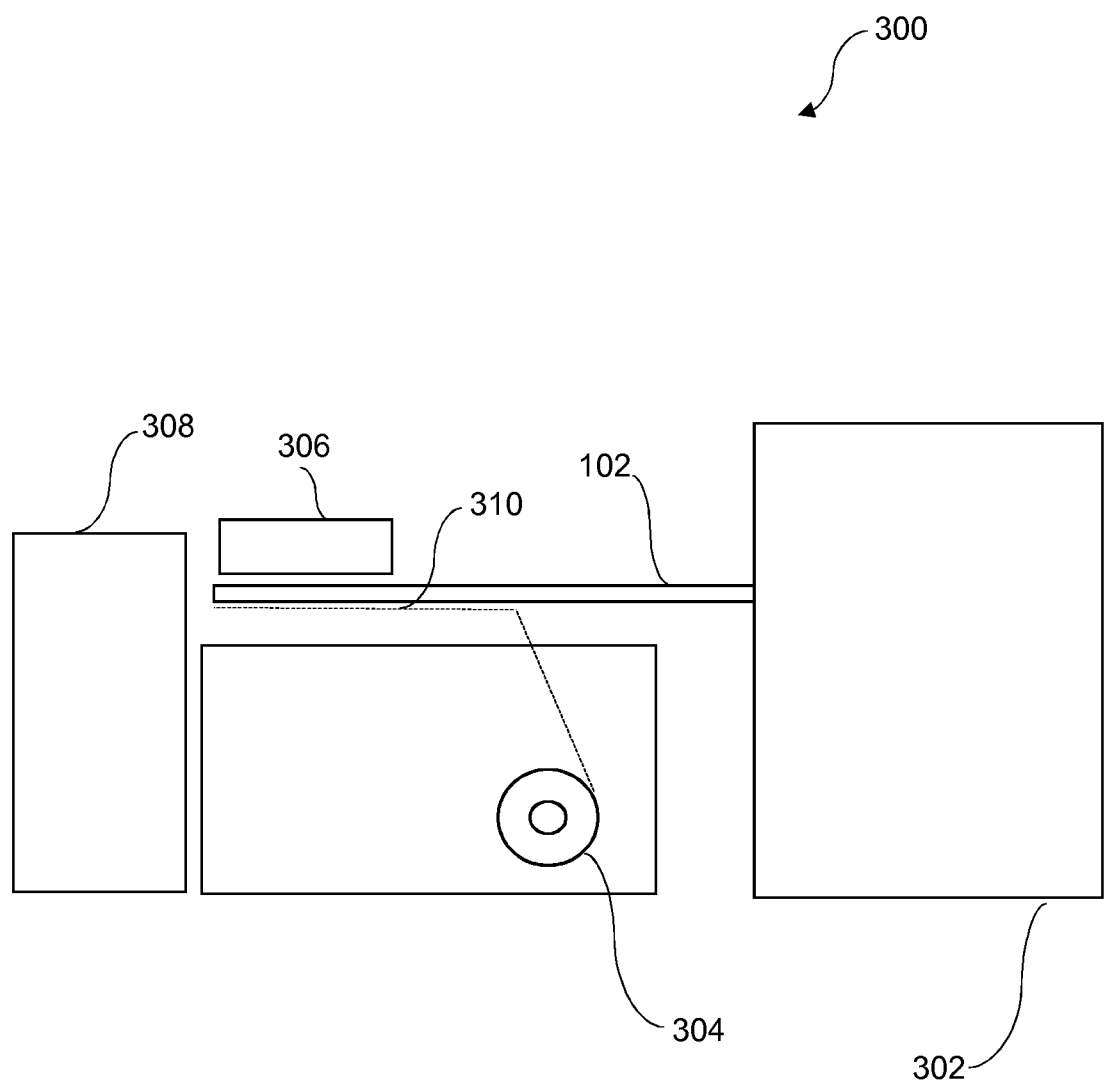

FIG. 3 shows a schematic diagram of an apparatus 300 for production of the aerosol-cooling elements 100 according to an embodiment of the present invention. Apparatus 300 comprises a crimping apparatus 302 which produces a continuous crimped internal structure 102, a material bobbin 304, which dispenses a layer of material around the continuous internal structure 102, a heat and press unit 306 and a cutting unit 308.

Figure 4:
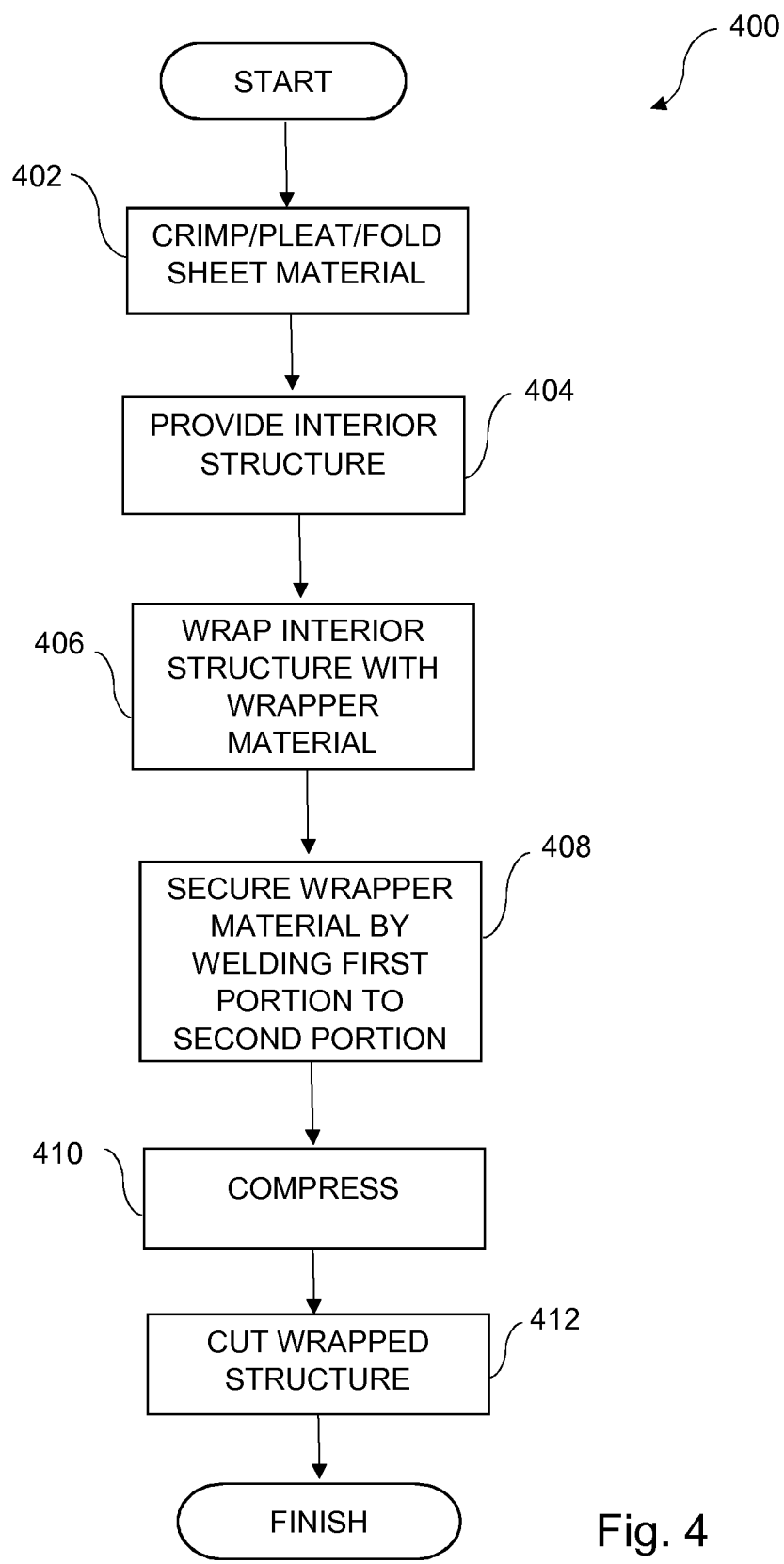

FIG. 4 shows a flow chart of a method 400 of manufacturing the aerosol-cooling elements 100 according to an embodiment of the present invention. In the method 400, the interior structure is provided 404 by crimping, pleating or folding 402 a sheet material into a continuous rod shaped interior structure 102. The interior structure 102 is wrapped 406 with a wrapper material 310. The wrapper material 310 is then secured 408 around the continuous interior structure 102 by welding a first portion 106 of the wrapper material 310 to a second portion 108 of the wrapper material 310. The first portion 106 of the wrapper material 310 is a region contiguous and parallel to a first edge 110 of the wrapper material 310 and the second portion 108 is a region contiguous and parallel to a second edge 112 of the wrapper material 310.

The continuous interior structure 102 has a longitudinal axis. Wrapping 406 the continuous interior structure 102 comprises placing the second edge 112 in contact with the continuous interior structure 102 and at a non-zero angle 114 to the longitudinal axis, and placing the first edge 110 over the second edge 112.

The continuous interior structure 102 and wrapper material 310 are compressed 410 to secure the wrapper material 310 around the continuous interior structure 102. The wrapped continuous interior structure 102 is then processed by the cutting unit 308 wherein it is cut 412 into the aerosol-cooling elements 100 of desired length 114, as shown in FIG. 1.

Figure 5:
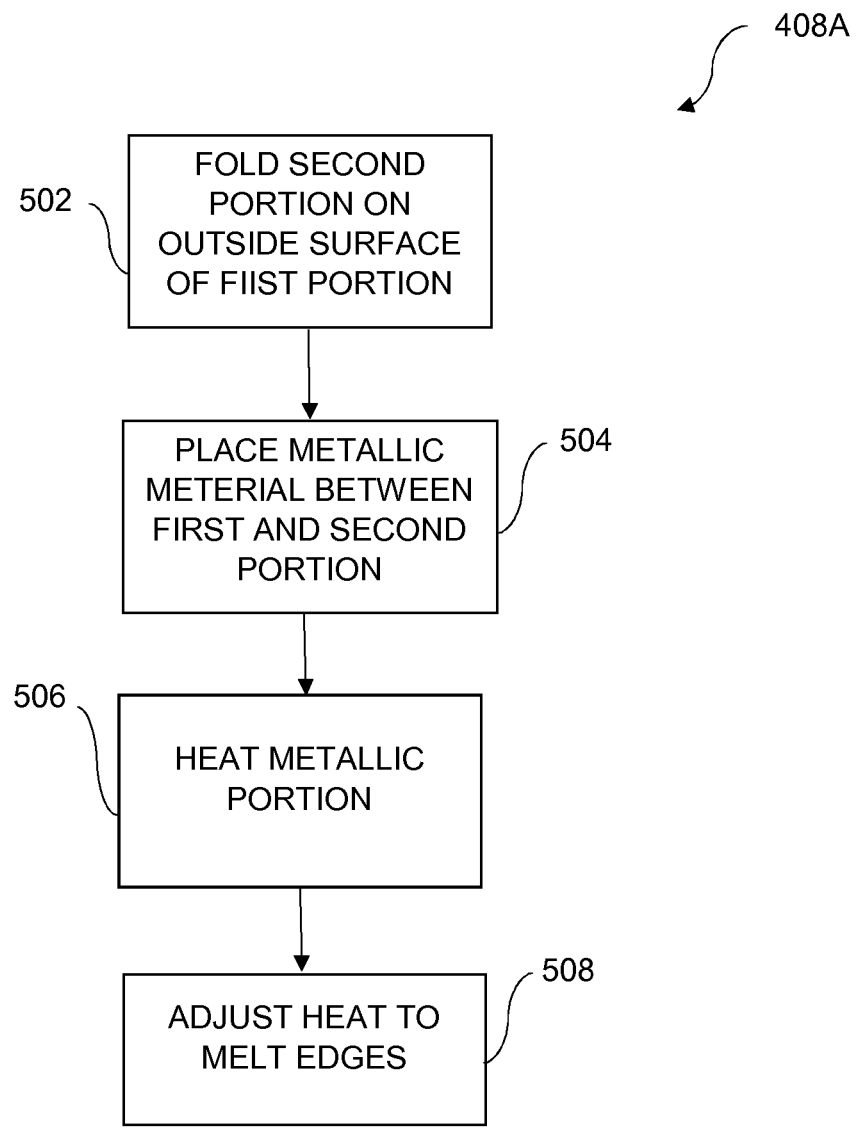

FIG. 5 shows a flow chart of a method 408A of securing the wrapper material 310 by melt-bonding according to an embodiment of the present invention.

In method 408A the second portion 108 is folded on an outside surface of the first portion 106. Heat from the heating and pressing unit 306 is adjusted to melt 508 the first and second portions 106, 108. With regard to FIG. 4, the melted portions 106, 108 are then compressed 410. During compression 410, the first and second portions 106, 108 are caught between the heating and pressing unit 306 above and the continuous internal structure 102 below. The continuous internal structure 102 can act as a backing block due to its resistance to compression. The wrapper material 310 is held and/or pressed by the heating and pressing unit 306 until the first and second portions 106, 108 have at least partially re-solidified.

In some examples, method 408A further comprises placing 504 a metallic material between the first portion 106 and second portion 108 of the wrapper material 310 and heating 506 the metallic material to at least partially melt the first portion 106 of the wrapper material 310.

The shape of a heating part of the heating and pressing unit 306 may be concave with a diameter in the range of an average diameter of the aerosol-cooling element 100. The heating part may also be smooth so that the heated wrapper material 310 remains smooth and cylindrical. Furthermore, the heating and pressing unit 306 may have an outside coating made from a non-stick material to prevent any wrapper material 310 having too much friction resistance or grip on the heating part surface. This is especially likely when the wrapper material is in a molten state. In some example, the outside coating is made from polytetrafluoroethylene (PTFE) or a similar material.

Figure 6:
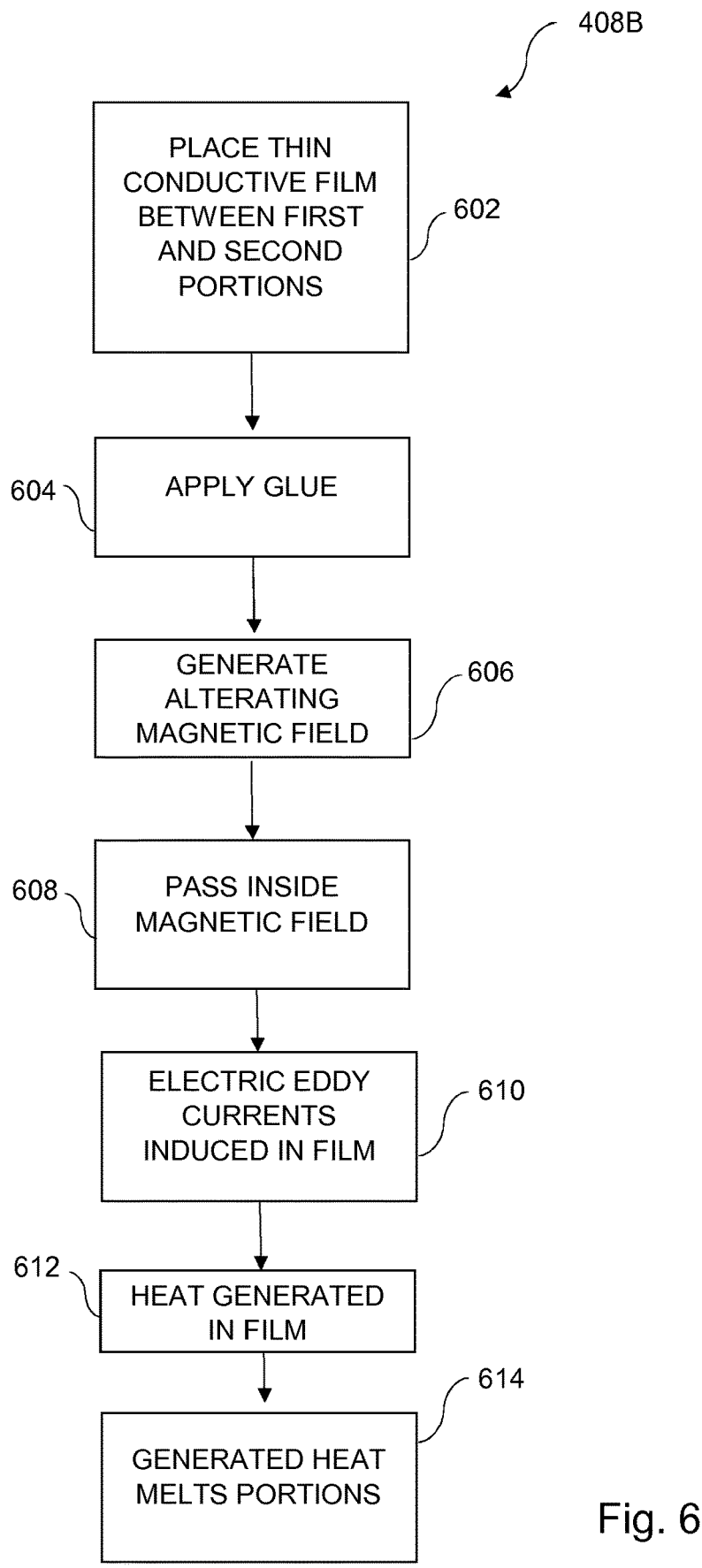

FIG. 6 shows a flow chart of an alternative method 408B of securing the wrapper material 310 using induction welding according to an embodiment of the present invention. In the method of securing the wrapper material 310 according to method 408B, the heating and pressing unit 306 comprises an induction heater. The induction heater comprises an electromagnet and an electronic oscillator that passes a high-frequency alternating current through the electromagnet. A thin conductive film is placed 602 between the first portion 106 and the second portion 108. The thin conductive film may be lightly glued 604 such that it stays in the correct position during the induction welding. An alternating current is passed through coils to generate 606 an alternating magnetic field. An area where the first portion 106, the conductive film and the second portion 108 are located is passed 608 inside the alternating magnetic field. The alternating magnetic field penetrates the film which induces 610 electric eddy currents in the film. The electric eddy currents flowing through the resistance of the film generate heat 612. The generated heat melts 614 the first portion 106 and the second portion 108 of the wrapper material 310. With regard to FIG. 4, the melted first and second portions 106, 108 are then compressed 410 together by the heating and pressing unit 306 until they have at least partially re-solidified.

Figure 7:
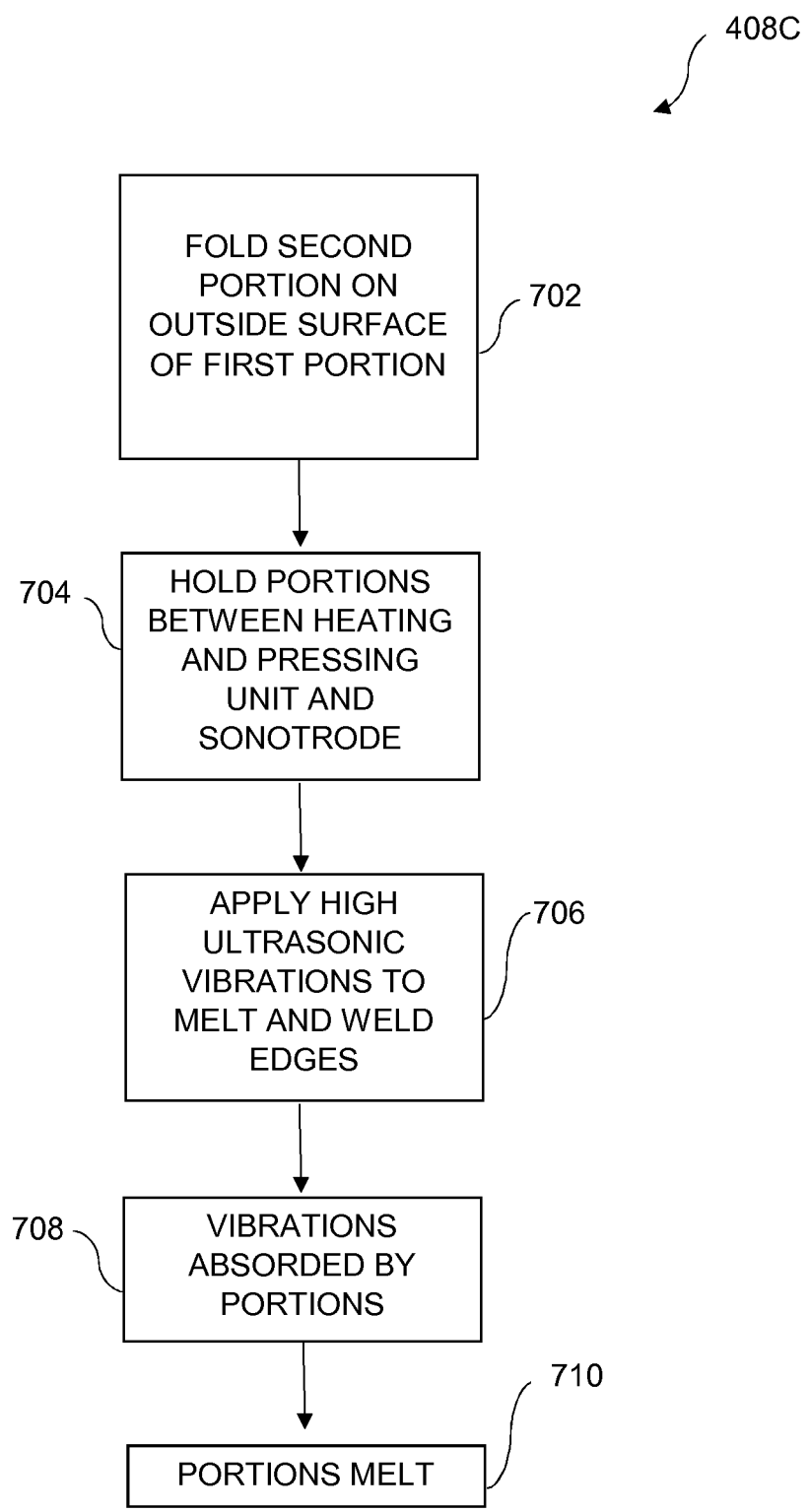

FIG. 7 shows a flow chart of another alternative method 408C of securing the wrapper material 310 using ultrasonic welding according to an embodiment of the present invention. In the method of securing the wrapper material 310 according to method 408C, the heating and pressing unit 306 comprises a sonotrode. Method 408C comprises folding 702 the second portion 108 on the outside surface of the first portion 106. The first and second portions are held 704 between the continuous internal structure 102 and/or heating and pressing unit and the sonotrode. The sonotrode is connected to a transducer such that high-frequency acoustic vibrations are emitted 706. Resulting vibrations are absorbed 708 by the first and second portions 106, 108 causing them to melt. With regard to FIG. 4, the melted first portion 106 and second portion 108 are then compressed 410 until they have at least partially re-solidified.

The wrapper material 310 may comprise or be made from a thermoplastic film such as a polylactic acid film. The continuous interior structure 102 may comprise or be made from a material resistant to compression such as polylactic acid.

With reference to FIG. 2, a method for manufacturing the aerosol-generating article 200 may comprise incorporating an aerosol-forming substrate 204, a filter 206 and the aerosol-cooling element 100 into a rod, wherein the aerosol-cooling element 100 is incorporated downstream of the aerosol-forming substrate 206.

In some embodiments, the filter 206 is a conventional mouthpiece filter formed from cellulose acetate. The filter 206 may have a length of about 45 millimetres.

Heat from the welding methods 408A, 408B and 408C could alter an outside surface of the aerosol-cooling element 100. However, the outside surface of the aerosol-cooling element 100 may be covered by at least one tipping paper in the final aerosol-generating article 200. This tipping paper is usually used to hold elements of the aerosol-generating article 200 together. Thus, any slight alterations or imperfections of the outside surface of the aerosol-cooling element 100 need not be visible in the final aerosol-generating article 200.

The aerosol-cooling element 100 may act to cool the temperature of a stream of aerosol drawn through the element by means of thermal transfer. Components of the aerosol will interact with the aerosol-cooling element 100 and lose thermal energy.

The aerosol-cooling element 100 derived from method 400 with the method of securing 408 the wrapper material 310 by welding according to methods 408A, 408B or 408C has the advantage that the wrapper material 310 is held by welding of the wrapper material itself as opposed to being held by a glue. Replacing gluing with the stronger holding mechanism of welding alleviates issues with the gluing not being strong enough to hold the sheet material, which may be highly resistant to mechanical compression, in a cylinder.

Thus, the associated problems that may result from gluing such as: expansion of the wrapper material, the cylinder unravelling, diameter control failure and glue pollution in equipment associated with the manufacture can be alleviated.

Another advantage of the present invention is that there is no need for substantially modification of existing equipment used in the manufacture of aerosol-generating articles. This has the effect that the method described herein of manufacturing aerosol-generating articles can be easily and cost effectively incorporated into current equipment and systems with only minor variations required. Processes wherein the equipment may not need to be modified to realise the method of manufacturing aerosol-generating articles as described herein include: equipment for the crimping process 302, equipment for the supplying the wrapper material 310, such as a bobbin, and equipment for cutting the rods 308. This has the advantage of keeping implementation costs low.

The invention claimed is:

1. An aerosol-cooling element for an aerosol-generating article, the aerosol-cooling element comprising:
   an interior structure formed by crimping and folding a sheet material to form a cylindrical rod, the cylindrical rod having a circumference C1 in the absence of any external compressive forces; and
   a wrapper material secured around the interior structure to form a rod with a circumference C2;
   wherein the wrapper material comprises a first portion welded to a second portion of the wrapper material;
   wherein the interior structure is under compression by the wrapper material when the wrapper material is secured around the interior structure;
   and wherein C1/C2 is in a range from 1.2 to 6.

2. An aerosol-cooling element according to claim 1, wherein C1/C2 is in a range from 1.3 to 4, optionally in a range from 1.4 to 2.5.

3. An aerosol-cooling element according to claim 1, wherein the first portion of the wrapper material is a region contiguous and parallel to a first edge of the wrapper material, and wherein the second portion is a region contiguous and parallel to a second edge of the wrapper material.

4. An aerosol-cooling element according claim 3, wherein the interior structure comprises a longitudinal axis and the second edge of the wrapper material is aligned at a non-zero angle to the longitudinal axis.

5. An aerosol-cooling element according to claim 1, wherein the first portion is welded to the second portion via a metallic strip.

6. An aerosol-cooling element according to claim 5, wherein the first portion is induction welded to the second portion.

7. An aerosol-cooling element according to claim 1, wherein the first portion is ultrasonically welded to the second portion.

8. An aerosol-cooling element according to claim 1, wherein the aerosol-cooling element has a length between 7 mm and 28 mm.

9. An aerosol-cooling element according to claim 1, wherein the aerosol-cooling element has a diameter between 5 mm and 12 mm.

10. An aerosol-cooling element according to claim 1, wherein the wrapper material comprises a polymer, and optionally wherein the interior structure comprises polylactic acid.

11. An aerosol-generating article in the form of a rod, the aerosol-generating article comprising an aerosol-cooling element of claim 1.

12. An aerosol-generating article according to claim 11, wherein the aerosol-generating article comprises an aerosol-forming substrate and the aerosol-cooling element is located downstream of the aerosol-forming substrate.

* * * * *